US008726465B2

(12) United States Patent
Schmehr

(10) Patent No.: US 8,726,465 B2
(45) Date of Patent: May 20, 2014

(54) HINGE ASSEMBLY

(75) Inventor: Peter Schmehr, Grettstadt (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/191,616

(22) Filed: Jul. 27, 2011

(65) Prior Publication Data

US 2012/0023705 A1    Feb. 2, 2012

(30) Foreign Application Priority Data

Jul. 30, 2010 (DE) .................. 10 2010 038 677
Oct. 5, 2010 (DE) .................. 10 2010 041 960

(51) Int. Cl.
| | |
|---|---|
| E05D 3/10 | (2006.01) |
| F16D 3/16 | (2006.01) |
| B60D 1/00 | (2006.01) |
| F16D 3/38 | (2006.01) |

(52) U.S. Cl.
USPC ............... 16/367; 403/78; 403/57; 280/492; 296/146.13

(58) Field of Classification Search
USPC ........... 16/366, 367, 386, 387, 224, 273, 275, 16/371, 86.1; 280/400, 442, 492; 296/202, 296/146.13; 403/53, 57, 58, 150, 151, 157, 403/158, 165, 78
See application file for complete search history.

(56) References Cited

U.S. PATENT DOCUMENTS

| | | | | | |
|---|---|---|---|---|---|
| 2,027,499 | A | * | 1/1936 | Tully ........................... | 280/492 |
| 2,050,071 | A | * | 8/1936 | Smith .......................... | 16/224 |
| 2,178,908 | A | * | 11/1939 | Hudson ........................ | 16/367 |
| 2,526,105 | A | * | 10/1950 | Adams ......................... | 464/115 |
| 2,551,136 | A | * | 5/1951 | Keltner ........................ | 280/492 |
| 2,584,648 | A | * | 2/1952 | Welsh .......................... | 464/109 |
| 2,871,030 | A | * | 1/1959 | Hollis .......................... | 280/492 |
| 3,163,901 | A | * | 1/1965 | Brawand ...................... | 403/13 |
| 3,300,258 | A | * | 1/1967 | Kompanek, Jr. et al. ..... | 384/280 |
| 3,404,486 | A | * | 10/1968 | Kellerhals .................... | 49/386 |
| 3,730,557 | A | * | 5/1973 | Cox ............................. | 280/504 |
| 4,243,339 | A | * | 1/1981 | Dickerson .................... | 403/4 |

(Continued)

FOREIGN PATENT DOCUMENTS

| | | | |
|---|---|---|---|
| DE | 2837387 | A * | 3/1979 |
| DE | 2914972 | A1 | 10/1979 |

(Continued)

OTHER PUBLICATIONS

Physics30.jpg. 2010. Photograph. NeoAxis Engine. NeoAxis Engine. By Neoaxis Game Engine. NeoAxis Group Ltd., Jun. 12, 2010. Web. Dec. 26, 2012. <http://www.neoaxis.com/wiki/File:Physics30.jpg>.*

*Primary Examiner* — Victor Batson
*Assistant Examiner* — Jason W San
(74) *Attorney, Agent, or Firm* — Bryan Peckjian; SKF USA Inc.

(57) ABSTRACT

A hinge assembly comprises a first machine part having a first axis, a second machine part having a second axis and a hinge part pivotably connecting the first machine part with the second machine part. The first machine part is connected with the hinge part via at least one first hinge point configured to permit rotation of the first machine part around the first axis relative to the hinge part. The second machine part is connected with the hinge part via at least one second hinge point configured to permit rotation of the second machine part around the third axis relative to the hinge part. The third axis is perpendicular to the second axis.

18 Claims, 3 Drawing Sheets

(56) References Cited

U.S. PATENT DOCUMENTS

| | | | |
|---|---|---|---|
| 4,365,488 A * | 12/1982 | Mochida et al. | 464/132 |
| 4,430,905 A * | 2/1984 | Bruguera | 74/493 |
| 4,498,888 A * | 2/1985 | Pastor | 464/112 |
| 4,512,679 A * | 4/1985 | Petrzelka et al. | 403/57 |
| 4,548,423 A * | 10/1985 | Craven | 280/492 |
| 4,579,546 A * | 4/1986 | Pastor | 464/112 |
| 4,582,503 A * | 4/1986 | Sherman, II | 464/139 |
| 4,592,686 A * | 6/1986 | Andrews | 410/101 |
| 4,643,699 A * | 2/1987 | Taig | 464/112 |
| 4,693,698 A * | 9/1987 | Olson, II | 464/111 |
| 4,702,722 A * | 10/1987 | Narue et al. | 464/93 |
| 4,705,422 A * | 11/1987 | Tsui et al. | 403/60 |
| 4,711,461 A * | 12/1987 | Fromberg | 280/494 |
| 4,869,556 A * | 9/1989 | Gees | 301/126 |
| 5,062,730 A * | 11/1991 | Tomii et al. | 403/57 |
| 5,073,145 A * | 12/1991 | Ratzokwski et al. | 464/157 |
| 5,186,483 A * | 2/1993 | Sheppard | 280/494 |
| 5,277,659 A * | 1/1994 | Cornay | 464/12 |
| 5,312,199 A * | 5/1994 | Smith, Jr. | 403/79 |
| 5,352,056 A * | 10/1994 | Chandler | 403/79 |
| 5,628,578 A * | 5/1997 | McClanahan et al. | 403/290 |
| 5,715,600 A * | 2/1998 | Marriott et al. | 29/898.07 |
| 5,765,851 A * | 6/1998 | Parent | 280/491.4 |
| 5,848,815 A * | 12/1998 | Tsui et al. | 294/215 |
| 5,864,320 A * | 1/1999 | Baghdasarian | 343/757 |
| 5,975,786 A * | 11/1999 | Chang | 403/78 |
| 6,022,164 A * | 2/2000 | Tsui et al. | 403/78 |
| 6,032,993 A * | 3/2000 | Kwon | 294/215 |
| 6,141,829 A * | 11/2000 | Boyer | 16/224 |
| 6,146,280 A * | 11/2000 | Pulford, Jr. | 464/112 |
| 6,203,038 B1 * | 3/2001 | Bernhard | 280/93.502 |
| 6,557,432 B2 * | 5/2003 | Rosheim | 74/490.05 |
| 6,749,237 B1 * | 6/2004 | Ma | 294/180 |
| 6,863,252 B2 * | 3/2005 | Bosson | 248/278.1 |
| 6,877,758 B2 * | 4/2005 | Colistro | 280/494 |
| 6,932,373 B2 * | 8/2005 | Seebohm et al. | 280/442 |
| 6,997,634 B2 * | 2/2006 | Zheng | 403/188 |
| 7,007,346 B2 * | 3/2006 | Hoffman | 16/367 |
| 7,014,230 B1 * | 3/2006 | Hung | 294/215 |
| 7,036,858 B2 * | 5/2006 | Buck | 294/215 |
| 7,090,583 B1 * | 8/2006 | Dine | 464/145 |
| 7,144,326 B2 * | 12/2006 | Thompson | 464/112 |
| 7,172,237 B2 * | 2/2007 | Bauman et al. | 296/146.1 |
| 7,232,140 B2 * | 6/2007 | Hamperl | 280/93.512 |
| 7,346,960 B2 * | 3/2008 | Higano et al. | 16/367 |
| 7,410,138 B2 * | 8/2008 | Parsons | 248/278.1 |
| 7,666,101 B2 * | 2/2010 | Kakimoto et al. | 464/134 |
| 7,690,082 B2 * | 4/2010 | Chuang | 16/367 |
| 7,707,690 B2 * | 5/2010 | Lowry et al. | 16/367 |
| 7,725,989 B2 * | 6/2010 | Huang et al. | 16/367 |
| 7,870,645 B2 * | 1/2011 | Kim | 16/366 |
| 7,870,646 B2 * | 1/2011 | Levey et al. | 16/374 |
| 7,938,431 B1 * | 5/2011 | Snyder | 280/494 |
| 7,971,840 B2 * | 7/2011 | Hirschhorn | 248/281.11 |
| 7,979,960 B2 * | 7/2011 | Sano et al. | 16/367 |
| 8,091,180 B2 * | 1/2012 | Wang et al. | 16/367 |
| 8,100,212 B2 * | 1/2012 | Sawai et al. | 180/69.2 |
| 8,118,323 B2 * | 2/2012 | Hudson | 280/494 |
| D658,097 S * | 4/2012 | Choquette | D12/162 |
| 8,161,833 B2 * | 4/2012 | Benassi et al. | 74/15.2 |
| 8,196,883 B2 * | 6/2012 | Hirschhorn | 248/276.1 |
| 8,201,867 B2 * | 6/2012 | Thomeczek | 294/215 |
| 8,333,526 B2 * | 12/2012 | Long | 403/57 |
| 2002/0110406 A1 * | 8/2002 | Coles | 403/57 |
| 2006/0083580 A1 * | 4/2006 | Zheng | 403/161 |
| 2006/0107492 A1 * | 5/2006 | Chang et al. | 16/367 |
| 2006/0218750 A1 * | 10/2006 | Tajima | 16/367 |
| 2006/0230580 A1 * | 10/2006 | Watanabe et al. | 16/367 |
| 2008/0108446 A1 * | 5/2008 | Faude | 464/136 |
| 2009/0070963 A1 * | 3/2009 | Lee | 16/367 |
| 2009/0145251 A1 * | 6/2009 | Benassi | 74/15.6 |
| 2010/0084527 A1 * | 4/2010 | Lau et al. | 248/217.4 |
| 2010/0120545 A1 * | 5/2010 | Huis | 464/134 |
| 2011/0278127 A1 * | 11/2011 | Gebhart | 192/66.1 |
| 2012/0004044 A1 * | 1/2012 | Conger et al. | 464/141 |
| 2012/0023705 A1 * | 2/2012 | Schmehr | 16/367 |
| 2012/0126498 A1 * | 5/2012 | Michel et al. | 280/5.52 |
| 2012/0153653 A1 * | 6/2012 | Lavalley et al. | 294/86.41 |
| 2012/0245711 A1 * | 9/2012 | Park | 700/13 |

FOREIGN PATENT DOCUMENTS

| | | | |
|---|---|---|---|
| DE | 3017314 A | * | 11/1980 |
| DE | 102006008870 A1 | * | 8/2006 |
| EP | 1726507 A1 | * | 11/2006 |
| FR | 2964309 A1 | * | 3/2012 |
| GB | 2004590 A | * | 4/1979 |
| GB | 2018888 A | | 10/1979 |
| GB | 2074522 A | * | 11/1981 |
| GB | 2074857 A | * | 11/1981 |
| JP | 2006296868 A | * | 11/2006 |
| JP | 2007135909 A | * | 6/2007 |
| KR | 2009006575 U | * | 7/2009 |
| WO | WO 9607557 A1 | * | 3/1996 |

* cited by examiner

HINGE ASSEMBLY

CROSS-REFERENCE

This application claims priority to German patent application no. 10 2010 041 960.5 filed on Oct. 5, 2010 and German patent application no. 10 2010 038 677.4 filed on Jul. 30, 2010, the contents of both of which are incorporated by reference as if fully set forth herein.

TECHNICAL FIELD

The present invention generally relates to a hinge assembly for the hinged bearing of a first machine part relative to a second machine part.

BACKGROUND

In construction vehicles, hinges are often required to provide a large tilt angle and/or pivot angle between two components (machine parts) that are disposed at an angle relative to each other. In most cases, such hinge assemblies include a ball joint and/or a hinge bearing. Due to the required tilt angle or pivot angle between the machine parts, which angle can exceed 40° in some cases, the sliding spherical surface of the ball joint can come out of the range of the slide surface at the maximum tilt angle so that it will be directly exposed to environmental influences.

Therefore, regular maintenance of previously known hinge assemblies of the above-mentioned type is required. A maintenance-free embodiment has not been possible for the previously known designs.

In addition, increased wear occurs in the known hinge assemblies due to dirt particles being brought into the interior of the hinge assembly via the slide surface.

SUMMARY

It is an object of the present teachings to provide improved hinge assemblies. In addition or in the alternative, the hinge assemblies may be essentially maintenance-free or, in any event, only require minimal maintenance, even for hinge assemblies capable of supporting relatively large pivot angles between the machine parts. In addition or in the alternative, the wear in the hinge assembly may be significantly reduced, thereby providing a durable, maintenance-free hinge assembly. In such embodiments, the hinge assembly may be particularly well suited for construction vehicles that are utilized in harsh environmental conditions.

In one aspect of the present teachings, a first machine part and a second machine part are each pivotably connected with a hinge part. The first machine part is connected with the hinge part via at least one first hinge point, which permits a rotation of the first machine part around the first axis relative to the hinge part. The second machine part is connected with the hinge part via at least one second hinge point, which permits a rotation of the second machine part around a third axis relative to the hinge part. The third axis is perpendicular to the second axis.

The hinge assembly is preferably designed to pivot the first machine part relative to the second machine part about a pivot angle of at least 20° about the third axis, more preferably at least 30°, even more preferably at least 40°.

A first plane, which is perpendicular to the first axis, and a second plane, which is perpendicular to the third axis, are preferably perpendicular to each other.

The first hinge point can comprise at least one slide bearing. The second hinge point can also include at least one slide bearing. In each case, the slide bearing can be designed as a sleeve made of or comprising a slidable or slide material. The sleeve is connected with one of the machine parts or with the hinge part. The sleeve is preferably made of steel, bronze, plastic or a composite material. In the embodiment that comprises the composite material, a sleeve (e.g., made of steel) provides the essential mechanical stability and a slidable layer, e.g., made of PTFE, can be applied to the sleeve, e.g., by rolling-in or running-in of PTFE powder.

In a preferred embodiment of the present teachings, an axial end-side portion of the sleeve includes a flange-like enlargement (extension in the radial direction) or flange, which comprises an axial slip surface that provides a low friction surface during start-up. In this embodiment, two partial bushings can also be provided, which each have a flange-shaped cross-section on the end-side. In this case, the two partial bushings are inserted into the hinge point from different sides. Thus, movements at the end faces are also possible in an optimal manner.

The first hinge point can comprise a pin formed on the axial end of the first machine part. The pin extends through a bore in the hinge part.

The second hinge point is preferably formed in two parts and is disposed in two parts of a fork-shaped end portion of the second machine part.

At least one of the two machine parts is preferably a pin of a construction vehicle, e.g., a bearing pin.

In another aspect of the present teachings, a hinge is provided that tiltably and/or pivotably connects two components (e.g., machine parts), e.g., shafts, that extend at an angle relative to each other in a manner. The hinge assembly may be designed as a type of a gimbal.

Further objects, advantages, and embodiments of the present teachings will be understood by the person of ordinary skill in the art after reviewing the exemplary embodiments described in the following in connection with the accompanying figures as well as the appended claims.

DETAILED DESCRIPTION OF THE EMBODIMENTS

Figure 1:
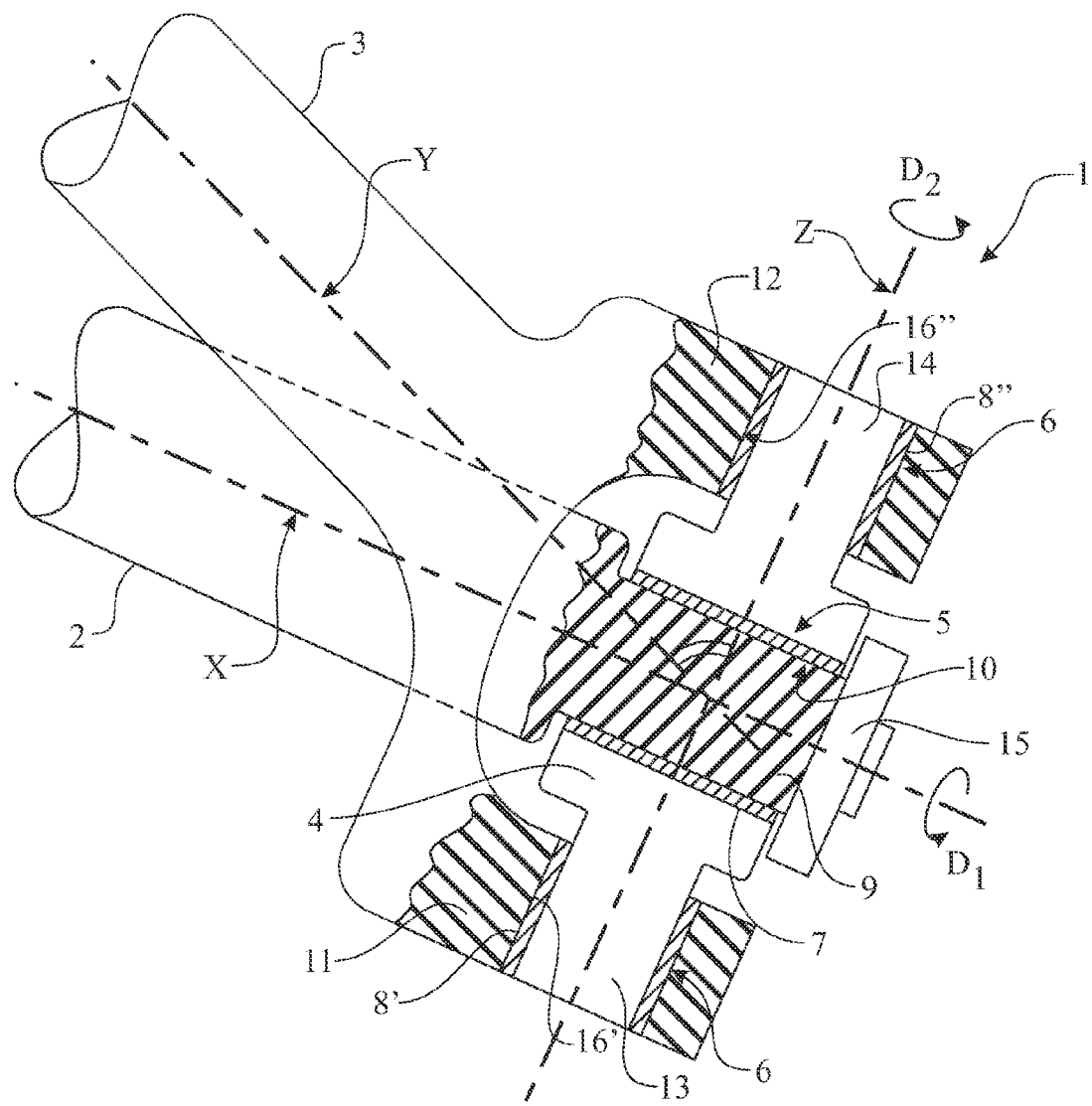
FIG. 1 schematically shows two machine parts of a construction vehicle, which are disposed so as to be pivotable relative to each other.
Figure 4:
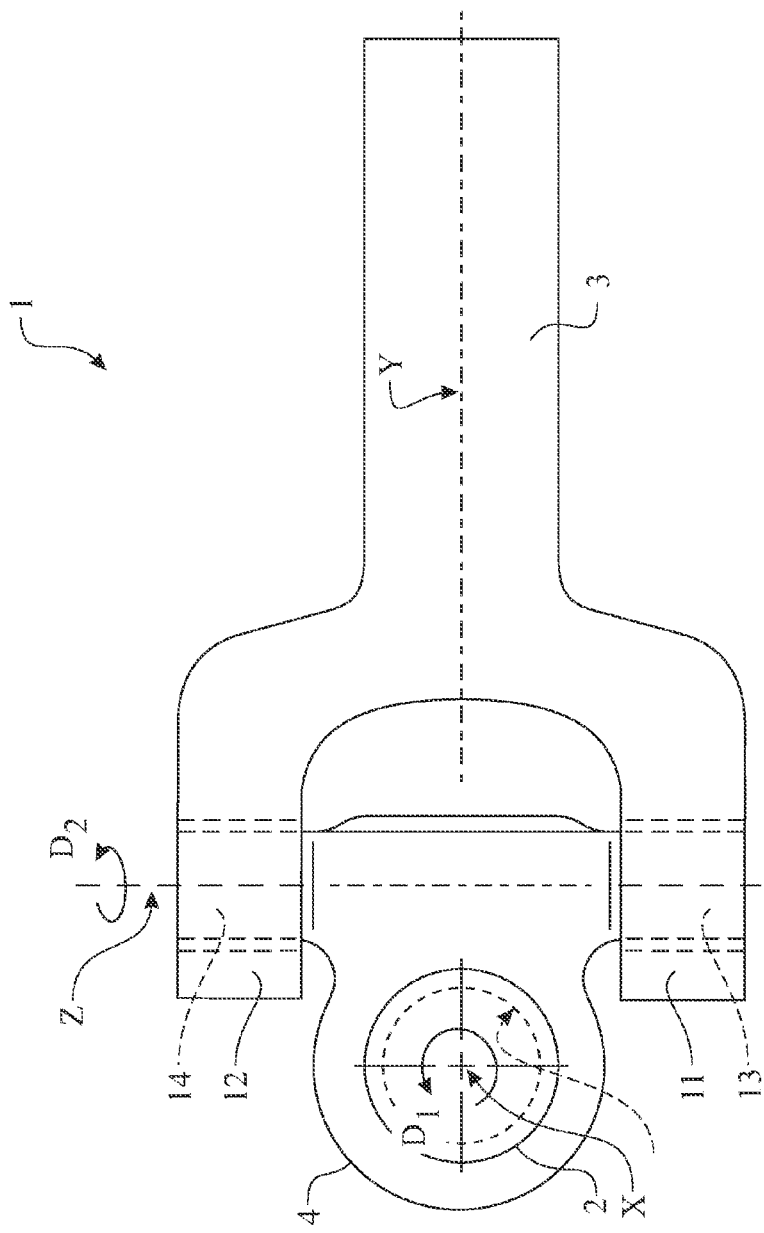
FIG. 4 schematically shows the two machine parts, wherein the illustration presents relative angles between a first machine part, a second machine part, and a hinge part.

In FIGS. 1 and 4, a hinge assembly 1 connects a first machine part 2 with a second machine part 3 in such a manner that a large relative pivot angle between the machine parts 2, 3 is made possible, e.g., in the range of 40° between the first axis X of the first machine part 2 and the second axis Y of the second machine part 3.

More particularly, the two machine parts 2, 3 are connected with a hinge part 4 in a hinged manner so that the hinge part 4 acts as intermediate link between the two machine parts 2, 3.

A first hinge point 5 is formed between the first machine part 2 and the hinge part 4. In the present embodiment, the hinge point 5 is formed as a slide bearing 7, wherein the slide bearing 7 is fabricated as a hollow-cylindrical sleeve made of or at least comprises a slide bearing material, e.g., a known slide bearing material. The slide bearing 7 is attached in a bore 10 of the hinge part 4 and supports a pin 9, which is formed in the axial end portion of the first machine part 2. A disk 15 can be, e.g., screwed onto an end side in order to axially affix the first machine part 2 relative to the hinge part 4.

A second hinge point 6 is formed between the second machine part 3 and the hinge part 4. The hinge point 6 is divided, in the present embodiment, into two partial hinge points. This hinge point and/or the two partial hinge points are also each formed as a slide bearing 8' and 8", respectively, which each comprise a hollow-cylindrical sleeve made of a slide bearing material. The two slide bearings 8', 8" are attached in a first fork bore 16' and a second fork bore 16", respectively, in the fork-like end portion of the second machine part 3, i.e. in the parts 11 and 12 of the fork. The two slide bearings 8', 8" respectively support the pins 13 and 14 of the hinge part 4.

As a result of this arrangement, the second machine part 3 can pivot about a third axis Z relative to the hinge part 4. The third axis Z is perpendicular to the second axis Y (see the pivot angle $D_2$ illustrated in FIG. 1). It is noted that the first machine part 2 lies in the plane of the drawing of FIG. 1 in FIG. 1, whereas the second machine part 3 projects out of the drawing plane. A right angle between the axes Y and Z is defined at their intersection.

The first machine part 2 of the hinge assembly 1 is thus pivotably supported with the pin 9 in the hinge part 4 so that the hinge part 4 can pivot about the pin 9, i.e. about the first axis X. This pivoting movement is indicated by $D_1$ in FIG. 1. The first machine part 2 can, e.g., be a part of a housing of a construction vehicle.

The hinge part 4 further includes two pins 13 and 14 extending from respective ends thereof. The pins 13 and 14 are pivotably supported in the fork by the parts 11 and 12.

A first pivot plane between the first machine part 2 and the hinge part 4 and a second pivot plane between the hinge part 4 and the fork are preferably perpendicular to one another.

The second machine part 3 is, e.g., a part of a cylindrical shaft of a pneumatic or hydraulic cylinder of the construction vehicle. The fork, which is located in the axial end portion of the second machine part 3, can be embodied as one-piece. However, it can instead include two half-shells, which are screwed onto the pins 13, 14 of the hinge part 4.

Figure 2:
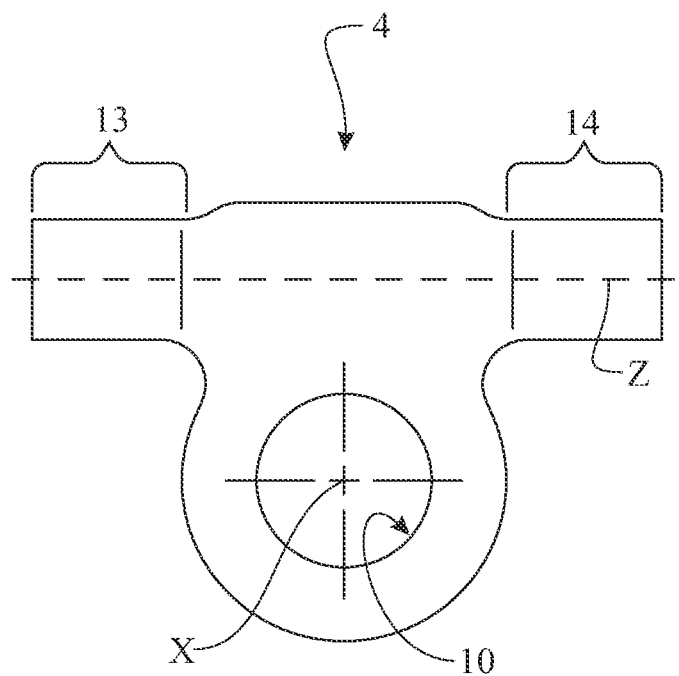
FIG. 2 shows the hinge part of the hinge assembly of FIG. 1 in a view along the direction of the first axis of the hinge assembly.
Figure 3:
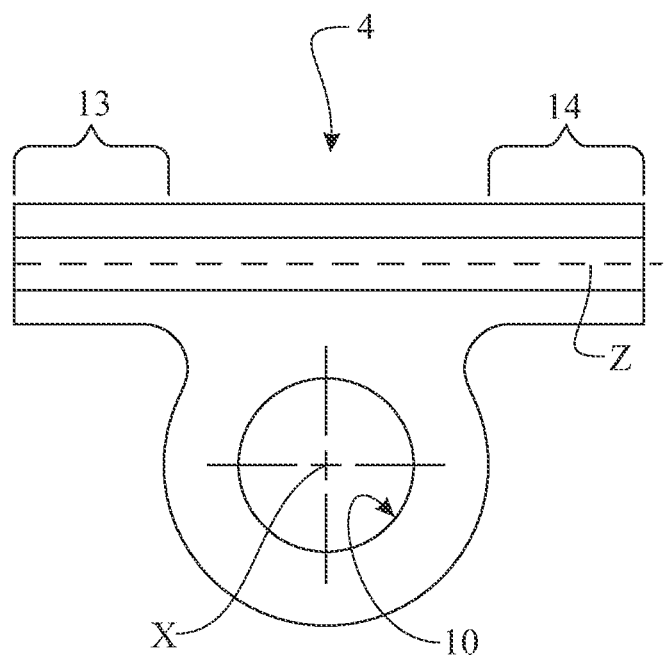
FIG. 3 shows an alternative embodiment of the hinge part in the illustration similar to FIG. 2.

Two possible embodiments of the hinge part 4 are illustrated in FIG. 2 and FIG. 3, which show a view along the direction of the first axis X. The slide bearing 7 with the bore 10 for receiving the pin 9 of the first machine part 2 can be seen in the lower portion. The pins 13 and 14 of the hinge part 4 that will be retained in the fork of the second machine part 3 can be recognized above.

In FIG. 3, the upper portion is provided with a bore. Pins can be inserted into this bore and pins may also be supported in the bore, if desired, by sleeves. In this embodiment, a kinematic reversal is thus provided, as compared with FIG. 2.

The second machine part 3, e.g., a cylindrical shaft, is retained on the first machine part 2 and, in particular, on its pin 9, which can support large loads. At the same time, the second machine part 3 can carry out a pivoting and/or tilting movement about a relatively large angle due to the three-dimensional connection to the first machine part 2. The pivoting may be divided into two partial pivot movements. Accordingly, this pivoting arrangement can be implemented in a simple manner and even with known slide or roller bearings that are preferably sealed.

In such embodiments, no maintenance and/or, in any case, a very simple maintenance with little wear as well is provided in an advantageous manner as compared with the previously known hinge assemblies having a ball joint.

REFERENCE NUMBER LIST 1 hinge assembly
2 first machine part
3 second machine part
4 hinge part
5 first hinge point
6 second hinge points
7 slide bearing
8' slide bearing
8" slide bearing
9 first machine part pin (bolt)
10 hinge part bore
10' annular ring portion about the hinge part body bore
11 first part of the fork
12 second part of the fork
13 pin (bolt)
14 pin (bolt)
15 disk
16' first fork bore
16" second fork bore
17 second machine part elongated portion
20 first axis and second axis defining plane
21 second axis and third axis defining plane
S span or void extending between first part of fork and second part of fork
X first axis (elongated axis of the first machine part/hinge part bore axis)
Y second axis (elongated axis of the second machine part)
Z third axis (hinge part axis central rotational axis of the first fork bore and the second fork bore/hinge part longitudinal axis)

The invention claimed is:
1. A hinge assembly configured to support a first machine part relative to a second machine part in a hinged manner, the hinge assembly comprising:
the first machine part has a first machine part longitudinal axis, the first machine part comprising:
an elongated first machine part body,
a first machine part pin formed at an axial end of the first machine part body along the first machine part longitudinal axis formed in a shape enabling rotation of the elongated first machine part body about the first machine part longitudinal axis;
the second machine part has a second machine part longitudinal axis, the second machine part comprising:
a second machine part body comprising a second machine part elongated member having a fork-shaped end portion, wherein an elongated portion of the second machine part elongated member extends concentrically along the second machine part longitudinal axis,
the fork-shaped end portion comprising a first fork part having a first fork bore extending therethrough and perpendicular to the second machine part longitudinal axis, the first fork bore defining a first fork bore central rotational axis, and a second fork part having a second fork bore extending therethrough and perpendicular to the second machine longitudinal axis, the first fork bore central rotational axis is in alignment with a second fork bore central rotational axis, wherein the first fork part and the second fork part extend in a generally parallel and spatial arrangement forming the fork shaped end portion and a span defining a void extending between the first fork part and the second fork part;

a hinge part having a hinge part longitudinal axis, the hinge part comprising:

a hinge part body, a first hinge part pin extending outward from the hinge part body along said hinge part longitudinal axis in a first direction, a second hinge part pin extending outward from the hinged part body along said hinge part longitudinal axis in a second direction, wherein said second direction is opposite of said first direction, and a hinge part bore extending through the hinge part body, wherein a hinge part bore axis of the hinge part bore is located at a distance from the hinge part longitudinal axis and perpendicular to the hinge part longitudinal axis;

wherein at least one of the first machine part and second machine part is a bearing pin of a construction vehicle;

wherein the first machine part is rotationally assembled to the hinge part by inserting the first machine part pin into the hinge part bore permitting rotation of the first machine part about the first machine part longitudinal axis defining a first hinge point;

wherein the second machine part is pivotably connected with the hinge part by inserting the first hinge part pin into the first fork bore and inserting the second hinge part pin into the second fork bore, wherein the first machine part rotates about the first machine part longitudinal axis permitting rotation of the second machine part about the hinge part longitudinal axis defining a pair of second hinge points;

at least one of the first hinge point and the second hinge points comprise a slide bearing; wherein the first machine part longitudinal axis and second machine part longitudinal axis define a first machine part longitudinal axis and second machine part longitudinal axis defining plane, wherein the hinge part longitudinal axis is perpendicular to the first machine part longitudinal axis and second machine part longitudinal axis defining plane, wherein a rotational motion of the first machine part is about the first machine part longitudinal axis, the first machine part longitudinal axis is offset and perpendicular to the hinge part longitudinal axis and the first machine part longitudinal axis remains parallel to the first machine part longitudinal axis and second machine part longitudinal axis defining plane during the first machine part rotational motion, wherein a pivotal motion of the first machine part is about the hinge part longitudinal axis, and the first machine part longitudinal axis remains parallel to the first machine part longitudinal axis and second machine part longitudinal axis defining plane during the first machine part pivotal motion, wherein a pivotal motion of the second machine part is about the hinge part longitudinal axis, and the second machine part longitudinal axis remains parallel to the first machine part longitudinal axis and second machine part longitudinal axis defining plane during the second machine part pivotal motion.

2. The hinge assembly according to claim 1, wherein the first machine part is pivotable about the hinge part longitudinal axis, the rotation being relative to the second machine part by a pivot angle of at least 30°.

3. The hinge assembly according to claim 2, wherein a second axis and third axis defining plane is perpendicular to the first axis, and the first axis and second axis defining plane and the second axis and third axis defining plane are perpendicular to one another.

4. The hinge assembly according to claim 1, wherein each slide bearing comprises a sleeve that is one of:
   (i) made of a sliding material; and
   (ii) comprises a sliding material on an outer surface thereof; and
wherein the sleeve is connected with one of:
   (a) the first or second machine parts, and
   (b) the hinge part.

5. The hinge assembly according to claim 4, wherein the sleeve comprises at least one of steel, bronze, plastic and a composite material.

6. The hinge assembly according to claim 1, wherein a second axis and third axis defining plane is perpendicular to the first axis, and the first axis and second axis defining plane and the second axis and third axis defining plane are perpendicular to one another.

7. The hinge assembly according to claim 6, wherein each slide bearing comprises a sleeve that is one of:
   (i) made of a sliding material; and
   (ii) comprises a sliding material on an outer surface thereof; and
wherein the sleeve is connected with one of:
   (a) the first or second machine parts, and
   (b) the hinge part.

8. The hinge assembly according to claim 7, wherein the sleeve comprises at least one of steel, bronze, plastic and a composite material.

9. A hinge assembly comprising:

a first machine part has a first machine part longitudinal axis, the first machine part comprising:

an elongated first machine part body, a first machine part pin formed at an axial end of the first machine part body along the first machine part longitudinal axis formed in a shape enabling rotation of the elongated first machine part body about the first machine part longitudinal axis;

the second machine part has a second machine part longitudinal axis, the second machine part comprising:

a second machine part body comprising a second machine part elongated member having a fork-shaped end portion, wherein an elongated portion of the second machine part elongated member extends concentrically along the second machine part longitudinal axis, the fork-shaped end portion comprising a first fork part having a first fork bore extending therethrough and perpendicular to the second machine part longitudinal axis the first fork bore defining a first fork bore central rotational axis, and a second fork part having a second fork bore extending therethrough and perpendicular to the second machine longitudinal axis, the first fork bore central rotational axis is in linear alignment with a second fork bore central rotational axis, wherein the first fork part and the second fork part extend in a generally parallel and spatial arrangement forming the fork shaped end portion and a span defining a void extending between the first fork part and the second fork part;

a hinge part having a hinge part longitudinal axis, the hinge part comprising:

a hinge part body, a first hinge part pin extending outward from the hinge part body along said hinge part longitudinal axis in a first direction, a second hinge part pin extending outward from the hinge part body along said hinge part longitudinal axis in a second direction, wherein said second direction is opposite of said first direction, and a hinge part bore extending through the hinge part body, wherein a hinge part bore axis of the hinge part bore is located at a distance from the hinge part longitudinal axis and perpendicular to the hinge part longitudinal axis;

wherein the first machine part is rotationally assembled with the hinge part by inserting the first machine part pin into the hinged part bore to permit rotation of the first machine part around the first machine part longitudinal axis the rotation being relative to the hinge part defining a first hinge point, wherein the second machine part is pivotably connected with the hinge part by inserting the first hinge part pin into the first fork bore and inserting the second hinge part pin into the second fork bore, wherein the first machine part rotates about the first machine part longitudinal axis permitting rotation of the second machine part about a hinge part longitudinal axis defining a pair of second hinge points to permit rotation of the second machine part around the hinge part longitudinal axis, the rotation being relative to the hinge part, at least one of the first hinge point and the second hinge points comprise a slide bearing;

wherein the first machine part longitudinal axis and second machine part longitudinal axis define a first machine part longitudinal axis and second machine part longitudinal axis defining wherein the hinge part longitudinal axis is perpendicular to the first machine part longitudinal axis and second machine part longitudinal axis defining plane, wherein a rotational motion of the first machine part is about the first machine part longitudinal axis, the first machine part longitudinal axis is offset and perpendicular to the hinge part longitudinal axis and the first machine part longitudinal axis remains parallel to the first machine part longitudinal axis and second machine part longitudinal axis defining plane during the first machine part rotational motion, wherein a pivotal motion of the first machine part is about the hinge part longitudinal axis, and the first machine part longitudinal axis remains parallel to the first machine part longitudinal axis and second machine part longitudinal axis defining plane during the first machine part pivotal motion, wherein a pivotal motion of the second machine part is about the hinge part longitudinal axis, and the second machine part longitudinal axis remains parallel to the first machine part longitudinal axis and second machine part longitudinal axis defining plane during the second machine part pivotal motion.

10. The hinge assembly according to claim 9, wherein:

the first machine part is pivotable about the hinge part longitudinal axis relative to the second machine part by a pivot angle of at least 30°;

at least one of the first and second machine parts comprises a bearing pin of a construction vehicle.

11. A hinge assembly comprising:

a hinge part assembly comprising:

a hinge part having a hinge part longitudinal axis and a hinge part transverse axis, wherein the hinge part transverse axis is perpendicular to the hinge part longitudinal axis, a hinge part bore formed through the hinge part along the hinge part transverse axis, the hinge part bore defining a first hinge point, the hinge part transverse axis being distally located from the hinge part longitudinal axis, a first pivot pin extending axially from the hinge part in a first direction along the hinge part longitudinal axis, a second pivot pin extending axially from the hinge part in a second direction along the hinge part longitudinal axis, wherein the first direction is opposite of the second direction;

a first machine part having a first machine part longitudinal axis, the first machine part being rotationally coupled to the hinge part through the first hinge point, wherein the first machine part rotates about the first machine part longitudinal axis; and a second machine part having a second machine part longitudinal axis, the second machine part being rotationally coupled to at least one of the first pivot pin and the second pivot pin, wherein the second machine part rotates about the hinge part longitudinal axis, wherein a rotational motion of the first machine part is about the first machine part longitudinal axis, the first machine part longitudinal axis is offset and perpendicular to the hinge part longitudinal axis and the first machine part longitudinal axis remains parallel to the first machine part longitudinal axis and second machine part longitudinal axis defining plane during the first machine part rotational motion, wherein a pivotal motion of the first machine part is about the hinge part longitudinal axis, and the first machine part longitudinal axis remains parallel to the first machine part longitudinal axis and second machine part longitudinal axis defining plane during the first machine part pivotal motion, wherein a pivotal motion of the second machine part is about the hinge part longitudinal axis, and the second machine part longitudinal axis remains parallel to the first machine part longitudinal axis and second machine part longitudinal axis defining plane during the second machine part pivotal motion.

12. The hinge assembly according to claim 11 further comprising a slide bearing assembled between the rotational coupling between first machine part and the first hinge point.

13. The hinge assembly according to claim 11, wherein:

the second machine part further comprises a fork formed at a connection end thereof, the fork comprising a first bore and a second bore and a span therebetween;

the first pivot pin is rotationally coupled to the fork by assembling a first bore slide bearing within the first bore and assembling the first pivot pin within the first bore slide bearing; and the second pivot pin is rotationally coupled to the fork by assembling a second bore slide bearing within the second bore and assembling the second pivot pin within the second bore slide bearing.

14. The hinge assembly according to claim 13, wherein the first pivot pin and the second pivot pin extend equidistant from the hinge part.

15. The hinge assembly according to claim 11, wherein the first pivot pin and the second pivot pin extend equidistant from the hinge part.

16. The hinge assembly according to claim 1, wherein at least one of the elongated first machine part body and the elongated second machine part body is formed having a rounded cross sectional shape.

17. The hinge assembly according to claim 1, the hinge part body further comprising an annular ring portion about the hinge part body bore,
   wherein a distance of the span between the first fork part and the second fork part is greater than a circumferential diameter taken along a direction parallel to the hinge part longitudinal axis and across the annular ring portion.

18. The hinge assembly according to claim 9, the hinge part body further comprising an annular ring portion about the hinge part body bore,
   wherein the span between the first fork part and the second fork part is greater than a circumferential diameter taken along a direction parallel to the hinge part longitudinal axis and across the annular ring portion.

\* \* \* \* \*